US012697861B2

(12) United States Patent　　　　(10) Patent No.:　US 12,697,861 B2
Kobayashi et al.　　　　　　　　　(45) Date of Patent:　　Aug. 4, 2026

(54) VEHICLE

(71) Applicant: TOYOTA JIDOSHA KABUSHIKI KAISHA, Toyota (JP)

(72) Inventors: Jun Kobayashi, Obu (JP); Takahiro Okano, Chiryu (JP); Mitsuyoshi Ohno, Miyoshi (JP); Nobuhiro Nakano, Nagakute (JP)

(73) Assignee: TOYOTA JIDOSHA KABUSHIKI KAISHA, Toyota Aichi-ken (JP)

( * ) Notice:　Subject to any disclaimer, the term of this patent is extended or adjusted under 35 U.S.C. 154(b) by 316 days.

(21) Appl. No.: 18/514,423

(22) Filed:　Nov. 20, 2023

(65)　　　　Prior Publication Data

US 2024/0190230 A1　　Jun. 13, 2024

(30)　　Foreign Application Priority Data

Dec. 9, 2022　(JP) ................................. 2022-197356

(51) Int. Cl.
　　*B60K 1/04*　　　　(2019.01)
　　*H01M 50/249*　　(2021.01)
　　*H01M 50/264*　　(2021.01)
　　*B60L 53/80*　　　(2019.01)
(52) U.S. Cl.
　　CPC ............. *B60K 1/04* (2013.01); *H01M 50/249* (2021.01); *H01M 50/264* (2021.01); *B60L 53/80* (2019.02); *H01M 2220/20* (2013.01)
(58) Field of Classification Search
　　CPC .... B60K 1/04; H01M 50/249; H01M 50/264;

H01M 2220/20; H01M 2/1083; B60L 53/80; B60L 11/1822; B60L 11/1877; B60L 50/64; B60S 5/06
See application file for complete search history.

(56)　　　　References Cited

U.S. PATENT DOCUMENTS

| | | | |
|---|---|---|---|
| 8,689,918 B2 * | 4/2014 | Yu ........................ | H01M 50/202 |
| | | | 180/68.5 |
| 9,290,088 B2 * | 3/2016 | Lejeune .................. | B60L 53/80 |
| 2014/0017936 A1 | 1/2014 | Hozumi et al. | |
| 2014/0342591 A1 * | 11/2014 | Kim ........................ | B60L 53/16 |
| | | | 439/159 |

FOREIGN PATENT DOCUMENTS

| | | |
|---|---|---|
| JP | 2012-192782 A | 10/2012 |
| JP | 2015-028939 A | 2/2015 |
| JP | 2021-044117 A | 3/2021 |
| WO | 2012/124700 A1 | 9/2012 |

* cited by examiner

*Primary Examiner* — Syed O Hasan
(74) *Attorney, Agent, or Firm* — Dinsmore & Shohl LLP

(57)　　　　　ABSTRACT

A vehicle includes a vehicle body and a battery attachable to and detachable from the vehicle body. The battery includes a battery side connector. The vehicle body includes a vehicle body side connector electrically connectable to the battery side connector and a holding portion that holds the vehicle body side connector. The holding portion holds the vehicle body side connector as being movable along a fitting direction in which the vehicle body side connector and the battery side connector are fitted to each other while the battery side connector is connected to the vehicle body side connector.

3 Claims, 7 Drawing Sheets

VEHICLE

CROSS-REFERENCE TO RELATED APPLICATIONS

This nonprovisional application is based on Japanese Patent Application No. 2022-197356 filed on Dec. 9, 2022 with the Japan Patent Office, the entire contents of which are hereby incorporated by reference.

BACKGROUND

Field

The present disclosure relates to a vehicle.

Description of the Background Art

Conventionally, a vehicle in which a battery can be replaced is known, for example, Japanese Patent Application Laid-Open No. 2012-192782 discloses that a portion where a battery is mounted is provided at a lower portion of a vehicle body, and a battery is replaced from below the vehicle body.

SUMMARY

In the battery electric vehicle described in Japanese Patent Application Laid-Open No. 2012-192782, when vibration occurs during traveling or the like, a load is applied to the connector on the vehicle side and the connector on the battery side.

It is an object of the present disclosure to provide a vehicle capable of reducing a load acting on a vehicle body side connector and a battery side connector.

A vehicle according to one aspect of the present disclosure includes a vehicle body on which a battery is mountable and the battery attachable to and detachable from the vehicle body. The battery includes a battery side connector. The vehicle body includes a vehicle body side connector electrically connectable to the battery side connector and a holding portion that holds the vehicle body side connector. The holding portion holds the vehicle body side connector as being movable along a fitting direction in which the vehicle body side connector and the battery side connector are fitted to each other while the battery side connector is connected to the vehicle body side connector.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
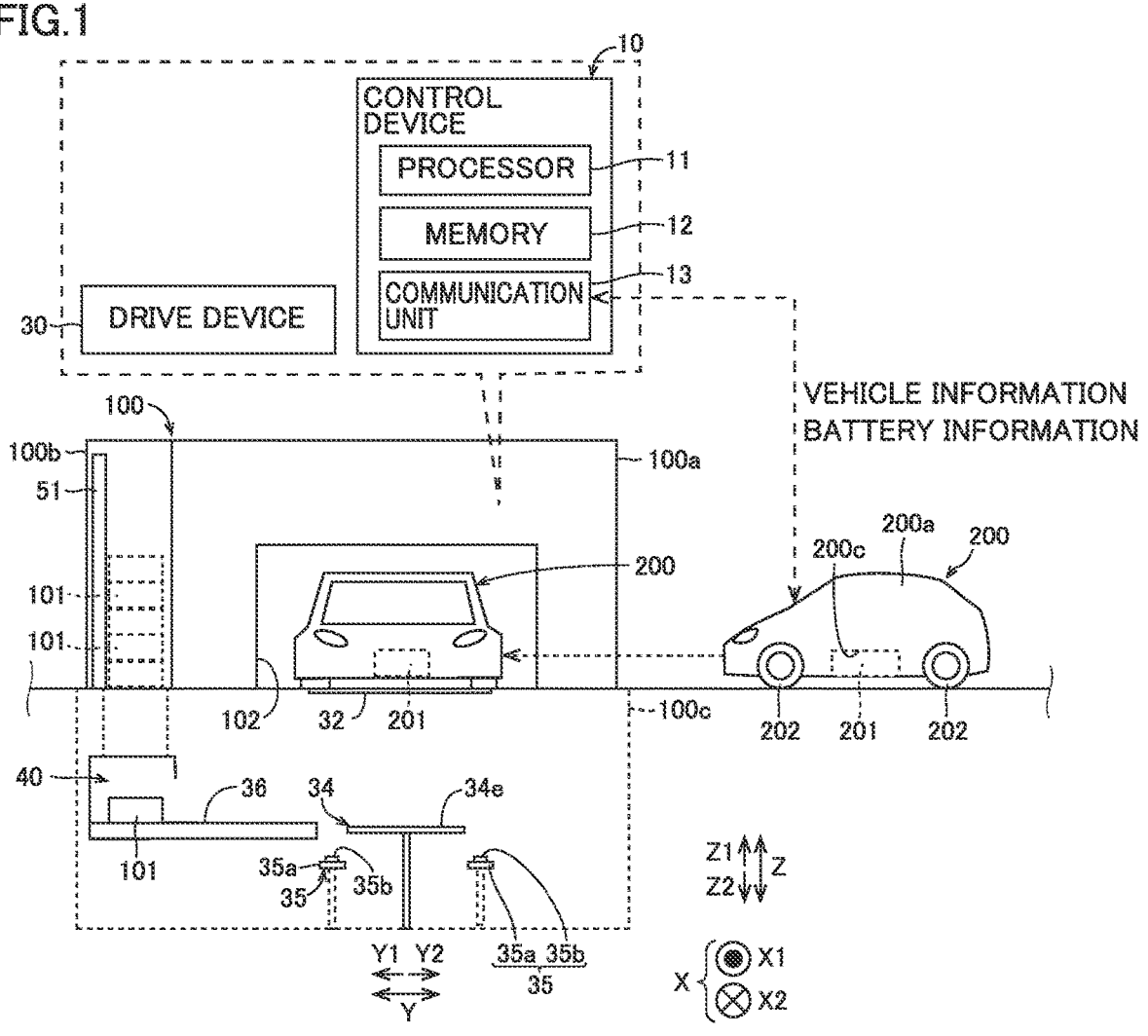
FIG. 1 schematically shows a battery replacement apparatus according to an embodiment of the present disclosure.

Hereinafter, embodiments of the present disclosure will be described in detail with reference to the accompanying drawings. In the drawings, the same or corresponding parts are denoted by the same reference numerals, and the description thereof will not be repeated.

FIG. 1 is a diagram showing a battery replacement apparatus 100 and an electrically powered vehicle 200 according to the present embodiment. The battery replacement apparatus 100 is a device for replacing a battery (used battery) 201 attached to the electrically powered vehicle 200 with a charged battery (new battery) 101. The battery 201 and the battery 101 are examples of the "first battery" and the "second battery" of the present disclosure, respectively.

(Configuration of Electrically Powered Vehicle)

Figure 3:
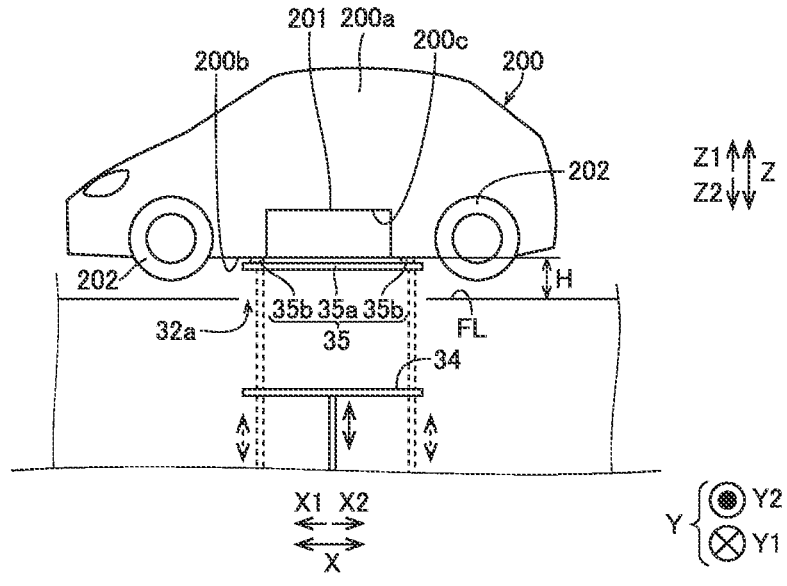
FIG. 3 is a diagram schematically showing a configuration of a battery mounting table and an elevator.

As shown in FIG. 3, the vehicle body 200a of the electrically powered vehicle 200 has a mounting portion 200c on which the batteries 101 and 201 can be mounted. As shown in FIG. 3, the mounting portion 200c opens downward. The mounting portion 200c has a shape recessed upward from the lower surface 200b of the vehicle body 200a. The batteries 101 and 201 are attachable to and detachable from the mounting portion 200c. Specifically, the batteries 101 and 201 are fastened to the mounting portion 200c by fastening members 201g (see FIG. 7) such as bolts.

Figure 8:
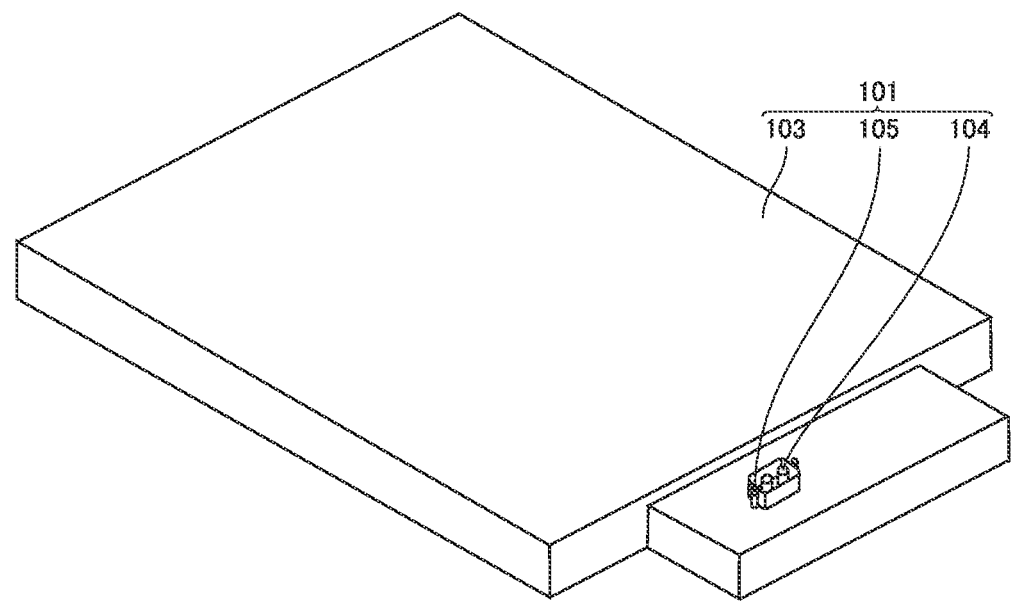
FIG. 8 is a perspective view schematically showing a configuration of a battery.

Next, the configuration of the battery will be described with reference to FIGS. 8 to 10. Hereinafter, the battery 101 will be described as an example. The battery 101 includes a battery main body 103, a battery side connector 104, and a pair of fitting pins 105.

The battery side connector 104 projects upward from the battery main body 103. The battery side connector 104 can be connected to a vehicle body side connector 204 (see FIGS. 9 and 10). The battery side connector 104 is provided with a magnet 109.

The pair of fitting pins 105 project upward from the battery main body 103. The pair of fitting pins 105 is disposed on the side of the battery side connector 104.

The mounting portion 200c has a vehicle body side connecting portion 203 which is fitted to the battery side connector 104 and the pair of fitting pins 105. As shown in FIGS. 9 and 10, the vehicle body side connecting portion 203 includes a vehicle body side connector 204, a holding portion 205, and a biasing member 206.

The vehicle body side connector 204 includes a connector main body 204a and a flange 204b.

The connector main body 204a is a portion electrically connected to the battery side connector 104. For example, the battery side connector 104 is provided with a claw portion (not shown), and the connector main body 204*a* is provided with a concave portion (not shown) that engages with the claw portion. The battery side connector 104 may be provided with a concave portion, and the connector main body 204*a* may be provided with a claw portion. The connector main body 204*a* is provided with a magnet 209. Either the magnet 109 or the magnet 209 may be omitted.

The flange 204*b* extends outward from the connector main body 204*a* in a direction orthogonal to a fitting direction (vertical direction in FIG. 9) in which the connector main body 204*a* and the battery side connector 104 are fitted to each other. The flange 204*b* is connected to the upper end of the connector main body 204*a*.

The holding portion 205 holds the vehicle body side connector 204. The holding portion 205 holds the vehicle body side connector 204 so that the vehicle body side connector 204 can be moved along the fitting direction when the battery side connector 104 is connected to the vehicle body side connector 204. The holding portion 205 holds the vehicle body side connector 204 so that the vehicle body side connector 204 can move relative to the holding portion 205 in the orthogonal direction.

Figures 9, 10:
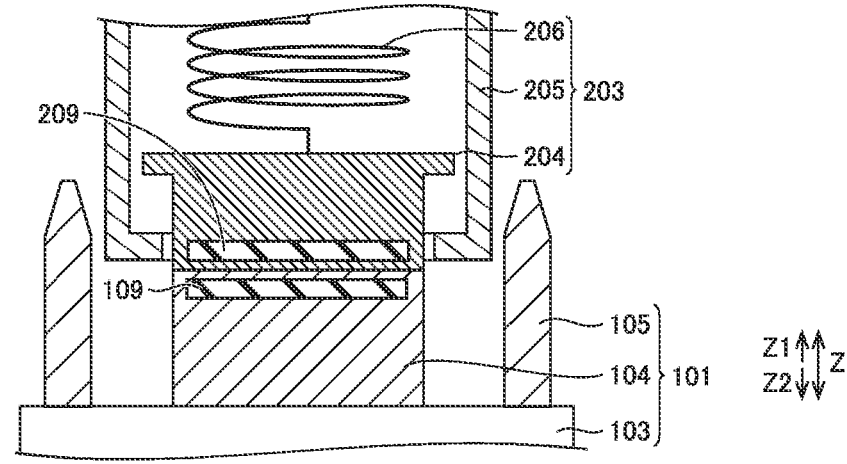
FIG. 9 is a cross-sectional view schematically showing a state before the battery side connector is connected to the vehicle body side connector.
FIG. 10 is a cross-sectional view schematically showing a state in which the battery side connector is connected to the vehicle body side connector.

As shown in FIGS. 9 and 10, the holding portion 205 includes a peripheral wall and a receiving portion.

The peripheral wall has a shape surrounding the vehicle body side connector 204. The peripheral wall guides the movement of the vehicle body side connector 204 along the fitting direction. A gap is formed between the peripheral wall and the flange.

The receiving portion is a portion for receiving the flange 204*b*. The receiving portion faces the flange 204*b* in the fitting direction. The receiving portion has a shape protruding inward in the orthogonal direction from the lower end portion of the peripheral wall. A gap is formed between the receiving portion and the connector main body 204*a*.

The biasing member 206 biases the vehicle body side connector 204 toward the battery side connector 104 along the fitting direction. When the battery side connector 104 is not connected to the vehicle body side connector 204 (the state shown in FIG. 9), the flange 204*b* is pressed against the receiving portion by the biasing force of the biasing member 206. The biasing member 206 is, for example, a coil spring. The biasing member 206 is disposed in the holding portion 205.

(Configuration of Battery Switching Device)

Next, the battery replacement apparatus 100 will be described. The battery replacement apparatus 100 includes a battery replacement station 100*a*, a storage box 100*b*, and an underfloor area 100*c*.

The battery replacement station 100*a* is a station in which the battery 201 is detached from the electrically powered vehicle 200 and the battery 101 is attached to the electrically powered vehicle 200. The battery replacement station 100*a* is provided with an entrance/exit 102 for the electrically powered vehicle 200 to enter/exit.

The storage box 100*b* stores the charged battery 101. The storage box 100*b* is provided in parallel with the battery replacement station 100*a*. A charging facility 51 capable of charging the battery 201 removed from the electrically powered vehicle 200 is provided in the storage box 100*b*. The battery 201 is charged by the charging facility 51 in the storage box 100*b*. The battery 101 charged in the storage box 100*b*, that is, the charged battery 101 is moved to the temporary place 40 provided in the underfloor area 100*c*, and then conveyed to the electrically powered vehicle 200.

The underfloor area 100*c* is provided below the battery replacement station 100*a* and the storage box 100*b*. The underfloor area 100*c* is provided with a battery mounting table 34, an elevator 35, and a transport unit 36, which will be described later.

The battery replacement apparatus 100 includes a control device 10 and a drive device 30.

The control device 10 includes a processor 11, a memory 12, and a communication unit 13. The memory 12 stores, in addition to a program executed by the processor 11, information (e.g., map, formula, and various parameters) used by the program. As will be described in detail later, the processor 11 controls the drive device 30.

The communication unit 13 includes various communication I/Fs. The processor 11 controls the communication unit 13. The communication unit 13 communicates with a DCM or the like of the electrically powered vehicle 200. The communication unit 13 and the electrically powered vehicle 200 can perform bidirectional communication. The communication unit 13 may communicate with a mobile terminal or the like possessed by the user of the electrically powered vehicle 200.

Figure 2:
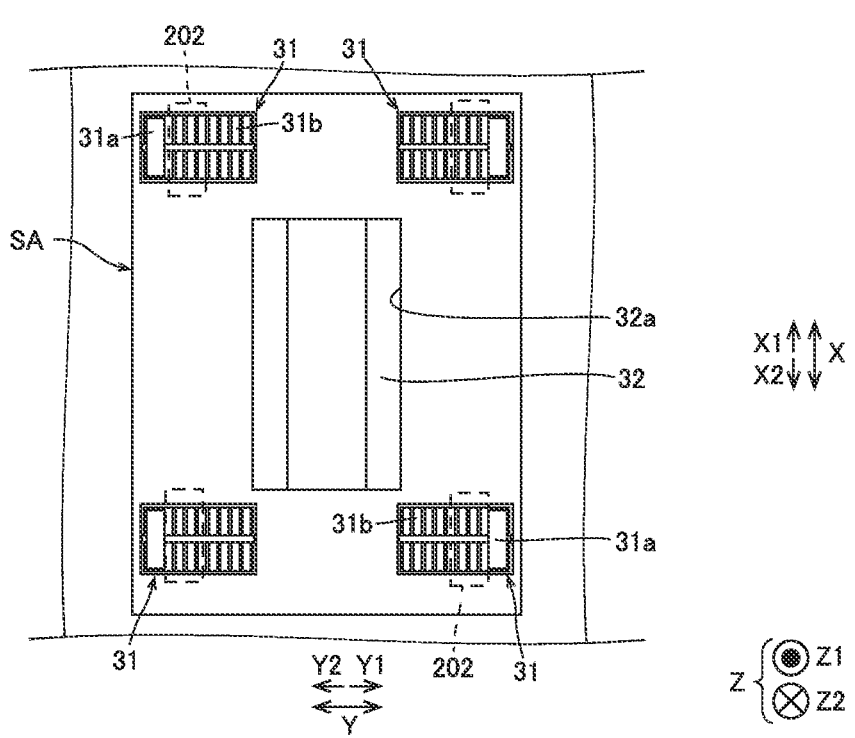
FIG. 2 is a plan view showing a vehicle stop region in the battery replacement apparatus.

As shown in FIG. 2, the battery replacement apparatus 100 is provided with a vehicle stop area SA. In a state in which the electrically powered vehicle 200 is stopped in the vehicle stop area SA, when the user performs an operation for instructing the start of the battery replacement operation in a navigation system (not shown) of the electrically powered vehicle 200, the communication unit 13 receives an instruction signal for starting the battery replacement operation from the electrically powered vehicle 200. The processor 11 starts the control of the battery replacement operation based on the reception of the instruction signal by the communication unit 13. The electrically powered vehicle 200 stops in the vehicle stop area SA such that the front-rear direction is the X direction and the left-right direction is the Y direction.

The drive device 30 includes a wheel fastener 31 (see FIG. 2), a shutter 32 (see FIG. 2), a battery mounting table 34 (see FIG. 1), an elevator 35 (see FIG. 1), and a transport unit 36 (see FIG. 1).

Referring again to FIG. 2, in vehicle stop area SA, four wheel fasteners 31 are provided. The wheel fasteners 31 are provided so as to correspond to the four wheels 202 of the electrically powered vehicle 200.

The wheel fastener 31 includes a pressing member 31*a* and a lateral roller portion 31*b*. The pressing member 31*a* moves the wheel 202 by pressing the wheel 202 from the outside (side). The pressing member 31*a* is disposed so as to straddle the lateral roller portion 31*b*. As a result, the wheel 202 is positioned by the wheel fastener 31.

The lateral roller portion 31*b* includes a plurality of rollers whose rotation axes extend in the X direction. The plurality of rollers of the lateral roller portion 31*b* are arranged in the Y direction. By the rotation of the plurality of rollers of the lateral roller portion 31*b*, the pressing member 31*a* is moved along the Y direction.

As shown in FIG. 2, the shutter 32 is provided in the vehicle stop region SA. The shutter 32 is configured to be able to open and close an opening 32*a* formed in the floor FL of the vehicle stop region SA. The shutter 32 can be switched between an open state in which the opening 32*a* is opened and a closed state in which the opening 32*a* is closed.

The elevator 35 is movable in the vertical direction between a position higher than the floor FL and a position lower than the floor FL through the opening 32*a*. As shown in FIG. 3, the elevator 35 can raise the electrically powered vehicle 200 from below to a position where the wheels 202 of the electrically powered vehicle 200 float from the floor FL. The elevator 35 raises the electrically powered vehicle so that the height H of the lower surface 200b of the vehicle body 200a from the floor surface FL becomes a predetermined height.

The elevator 35 includes a pair of elevation bars 35a arranged at intervals in a direction (Y direction) orthogonal to the vertical direction. Each of the pair of elevation bars 35a is provided with two protrusions 35b protruding upward. The electrically powered vehicle 200 is supported from below by two protrusions 35b (i.e., four protrusions 35b) of each of the pair of elevation bars 35a.

Figure 4:
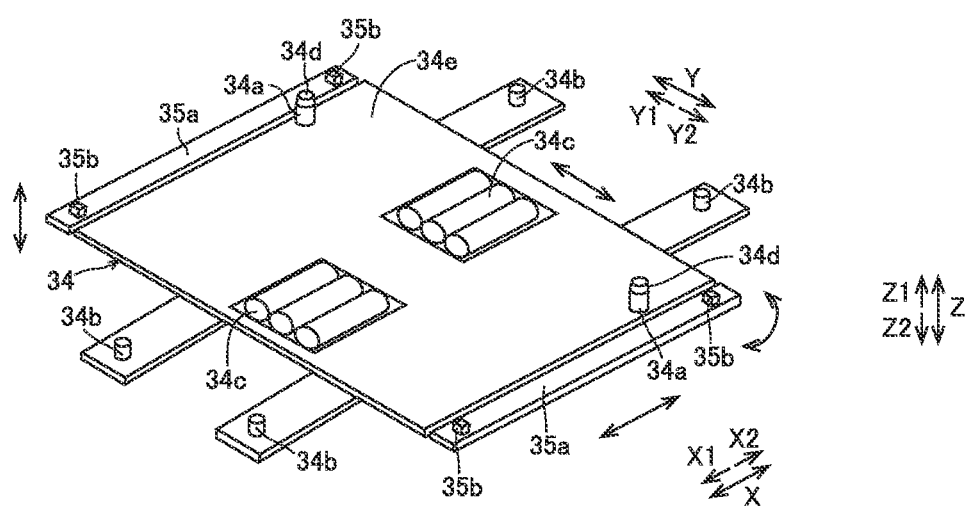
FIG. 4 is a perspective view schematically showing a configuration of a battery mounting table and an elevator.

The battery mounting table 34 is disposed below the battery replacement station 100a, more specifically, below the opening 32a. The battery mounting table 34 can mount the batteries 101 and 201 and can move in the vertical direction. As shown in FIG. 4, the battery mounting table 34 includes a base portion 34e, two positioning pins 34a, four locking/unlocking tools 34b, and a roller portion 34c.

The base portion 34e is disposed between the pair of elevation bars 35a. The base portion 34e is movable in the vertical direction. The base portion 34e is formed in a flat plate shape. The base portion 34e has an outer shape larger than the outer shape of the batteries 101 and 201. The base portion 34e is configured to be movable in the horizontal direction below the electrically powered vehicle 200. Specifically, the base portion 34e is movable in the X direction (X1 direction, X2 direction) and the Y direction (Y1 direction, Y2 direction). The base portion 34e is rotatable so as to change the direction (angle) in the XY plane. Each of the pair of elevation bars 35a may be movable similarly to the base portion 34e.

Each positioning pin 34a is provided on the base portion 34e. Each positioning pin 34a is a portion for positioning the vehicle body 200a of the electrically powered vehicle 200 and the base portion 34e. One positioning pin 34a is provided at one end of the base portion 34e in a direction (Y direction) parallel to the vehicle width direction. The other positioning pin 34a is provided at the other end of the base portion 34e in a direction (Y direction) parallel to the vehicle width direction.

Figure 5:
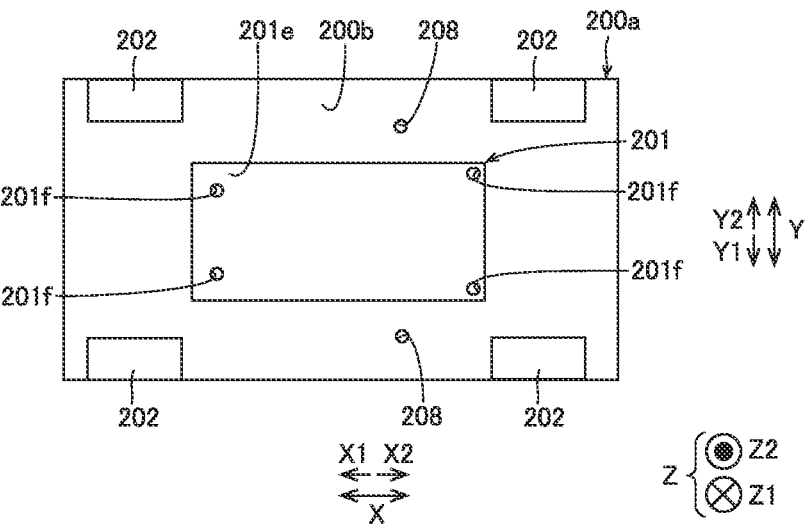
FIG. 5 is a bottom view of the electrically powered vehicle.

As shown in FIG. 5, the lower surface 200b of the vehicle body 200a of the electrically powered vehicle 200 is provided with pin insertion holes 208 into which the positioning pins 34a are inserted. Each positioning pin 34a can be inserted into the pin insertion hole 208.

Each locking/unlocking tool 34b is movable in the vertical direction. Each locking/unlocking tool 34b is movable in the vertical direction with respect to the base portion 34e. As shown in FIG. 4, each locking/unlocking tool 34b is disposed inside the pair of positioning pins 34a in the Y direction. Each locking/unlocking tool 34b is disposed outside the base portion 34e in the X direction.

As shown in FIG. 5, the battery 201 has a bottom surface 201e, and tool insertion holes 201f into which the respective locking/unlocking tools 34b are inserted are formed in the bottom surface 201e. A tool insertion hole is also formed in the bottom surface of the battery 101. Each locking/unlocking tool 34b can be inserted into a tool insertion hole.

The roller portion 34c is provided on the base portion 34e. The roller portion 34c is rotatable around a rotation axis extending in the X direction. When the roller portion 34c rotates in one direction, the batteries 101 and 201 relatively move toward one side (for example, the Y1 side) in the Y direction with respect to the base portion 34e, and when the roller portion 34c rotates in the other direction, the batteries 101 and 201 relatively move toward the other side in the Y direction with respect to the base portion 34e.

The marker 34d is provided at the distal end of each positioning pin 34a. The marker 34d may be tapered upward.

Referring again to FIG. 1, the transport unit 36 transports the battery 101 stored in the storage box 100b toward the battery mounting table 34. Specifically, in the underfloor area 100c, a temporary place 40 for temporarily placing the charged battery 101 stored in the storage box 100b is provided, and the transport unit 36 can transport the battery 101 from the temporary place 40 toward the battery mounting table 34. The transport unit 36 may be of a belt conveyor type, for example.

(Battery Replacement Method)

Figure 6:
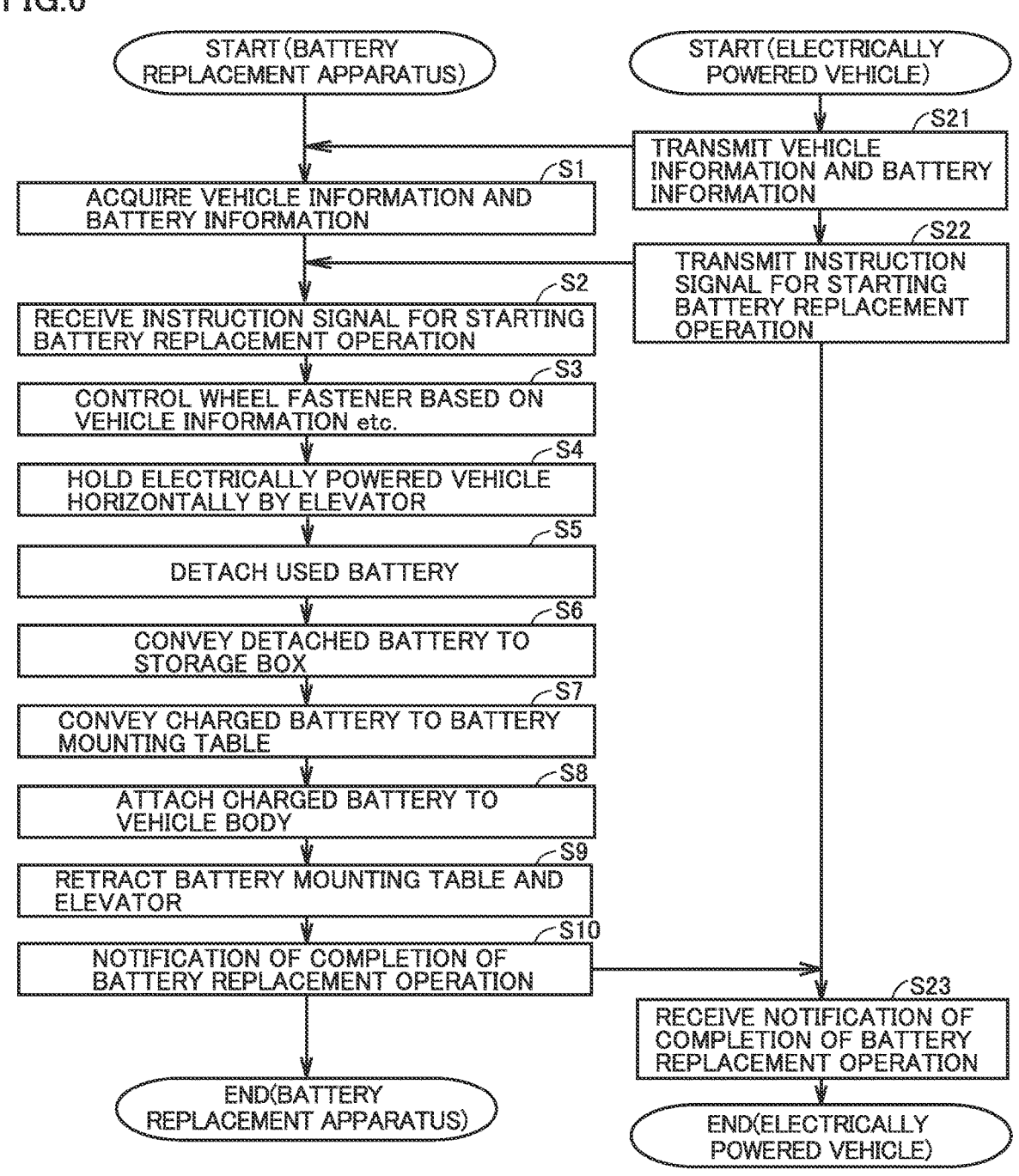
FIG. 6 is a flowchart showing each step of the battery replacement apparatus.

Next, a battery replacement method using the battery replacement apparatus 100 will be described with reference to a flowchart (sequence diagram) of FIG. 6.

[Transmission of Vehicle Information and the Like: Electrically Powered Vehicle]

First, in step S21, the electrically powered vehicle 200 transmits information about the electrically powered vehicle 200 and information about the battery 201 to the communication unit 13 of the battery replacement apparatus 100. For example, when an operation of transmitting the above information is performed in a navigation system (not shown) of the electrically powered vehicle 200, the above information is transmitted to the communication unit 13. The electrically powered vehicle 200 transmits the above information before entering the battery replacement apparatus 100. The above information may be transmitted after the electrically powered vehicle 200 has entered the battery replacement apparatus 100.

[Acquisition of Vehicle Information and the Like: Battery Replacement Apparatus]

Next, in step S1, the communication unit 13 of the battery replacement apparatus 100 acquires information about the electrically powered vehicle 200 and information about battery 201 transmitted from the electrically powered vehicle 200 in step S21 by communication. The acquired information is stored in the memory 12 (see FIG. 1).

The communication unit 13 may also acquire information on the capacity (charge capacity) of the battery 201 and the SOC (State Of Charge) of the battery 201.

[Transmission of an Instruction Signal for Battery Replacement Work: Electrically Powered Vehicle]

Next, in step S22, the electrically powered vehicle 200 stopped in the vehicle stop area SA transmits an instruction signal for starting the battery replacement operation to the communication unit 13.

[Receiving an Instruction Signal for a Battery Replacement Operation]

Next, in step S2, the communication unit 13 receives the instruction signal transmitted from the electrically powered vehicle 200 in step S22. In step S2, after receiving the instruction signal, the processor 11 may transmit an instruction message or the like for turning off the ignition power supply to the user of the electrically powered vehicle 200 through the communication unit 13.

[Control of Annulus: Battery Replacement Apparatus]

Next, in step S3, the processor 11 adjusts the position of the wheel fastener 31 (see FIG. 2) based on the information (vehicle information and battery information) acquired through the communication unit 13 in step S1. Note that the processor 11 may control each of the four wheel fasteners 31 independently of each other.

Thus, the position and orientation of the vehicle body 200a in the horizontal direction are adjusted, and the position and orientation of the battery 201 in the horizontal direction are adjusted. As a result, the battery 201 is moved to a predetermined position above the opening 32a.

[Holding the Vehicle Body Horizontally: Battery Replacement Apparatus]

Next, in step S4, the processor 11 raises the elevator 35 in a state where the shutter 32 is in the open state and the shutter 32 is in the open state. Thus, after passing through the opening 32a, the elevator 35 lifts the electrically powered vehicle 200 such that the height H of the lower surface 200b of the vehicle body 200a from the floor surface FL becomes a predetermined height (see FIG. 3).

[Removal of the Battery after Use: Battery Replacement Apparatus]

Figure 7:
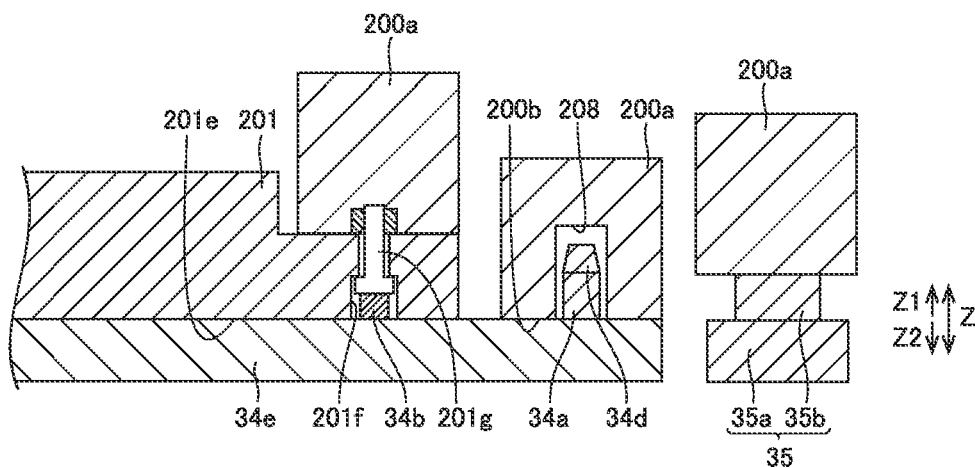
FIG. 7 is a view schematically showing a state in which the battery mounting table and the electrically powered vehicle are positioned with respect to each other.

Next, in step S5, the battery 201 after use is detached from the vehicle body 200a of the electrically powered vehicle 200. First, the processor 11 raises the battery mounting table 34. Thereby, as shown in FIG. 7, the positioning pin 34a is inserted into the pin insertion hole 208 formed in the lower surface 200b of the vehicle body 200a, the locking/unlocking tool 34b is inserted into the tool insertion hole 201f formed in the bottom surface 201e of the battery 201, and the base portion 34e comes into contact with or approaches the bottom surface 201e of the battery 201. As a result, the battery mounting table 34 is positioned with respect to the electrically powered vehicle 200 (battery 201). At this time, the positioning pin 34a is inserted into the pin insertion hole 208 before the locking/unlocking tool 34b is inserted into the tool insertion hole 201f.

Next, the processor 11 raises the locking/unlocking tool 34b in a state where the locking/unlocking tool 34b is inserted into the tool insertion hole 201f. Then, the processor 11 drives (rotates) the locking/unlocking tool 34b inserted into the tool insertion hole 201f. Thereby, the fastening member 201g in the tool insertion hole 201f is unlocked. As a result, the battery 201 is detached from the vehicle body 200a and mounted on the base portion 34e. The timing at which the positioning pin 34a is inserted into the pin insertion hole 208 and the timing at which the locking/unlocking tool 34b is inserted into the tool insertion hole 201f may be the same.

[Transportation of the Battery after Use to the Storage: Battery Replacement Apparatus]

Next, in step S6, the battery 201 removed from the vehicle body 200a in step S5 is conveyed to the storage box 100b (see FIG. 1). First, the processor 11 lowers the battery mounting table 34 on which the battery 201 is mounted to the height position of the transport unit 36 (see FIG. 1). Next, the processor 11 lowers the elevator 35 to a position below the battery mounting table 34 (for example, a position shown in FIG. 1). As a result, since the vehicle body 200a is not held by the elevator 35, the electrically powered vehicle 200 is placed on the floor FL of the vehicle stop area SA. Subsequently, the processor 11 drives the roller portion 34c (see FIG. 4) of the battery mounting table 34 so that the battery 201 moves on the base portion 34e in the storage direction (Y1 direction). Thereby, the battery 201 mounted on the base portion 34e moves on the base portion 34e toward the transport unit 36, and moves from the base portion 34e to the transport unit 36. The battery 201 is transported to the temporary place 40 by the transport unit 36, and then stored in the storage box 100b.

[Transporting the Charged Battery to a Battery Mounting Table:]

Next, in step S7, the processor 11 conveys the charged battery 101 stored in the storage box 100b to the battery mounting table 34. Specifically, after the processor 11 conveys the battery 101 from the storage box 100b to the temporary place 40 in the underfloor area 100c, the processor 11 conveys the battery 101 from the temporary place 40 to the battery mounting table 34 by the transport unit 36 along the conveying direction (Y2 direction). When the battery 101 moves from the transport unit 36 to the base portion 34e, the processor 11 drives the roller portion 34c so that the battery 101 moves on the base portion 34e along the conveying direction. As a result, the battery 101 stops at a predetermined position on the base portion 34e.

[Mounting of Charged Battery: Battery Replacement Apparatus]

Next, in step S8, the processor 11 performs control to attach the charged battery 101 to the vehicle body 200a. Specifically, the processor 11 raises the elevator 35 so that the height H of the lower surface 200b of the vehicle body 200a from the floor FL of the vehicle stop region SA becomes a predetermined height.

Next, the processor 11 raises the battery mounting table 34. Thereby, the positioning pin 34a is inserted into the pin insertion hole. In this state, the processor 11 raises the locking/unlocking tool 34b. Thereby, the locking/unlocking tool 34b is inserted into the tool insertion hole of the battery 101. Then, the processor 11 drives (rotates) the locking/unlocking tool 34b. Thus, the bolt in the tool insertion hole is locked. When it is detected that all the bolts have been locked, the vehicle body side connector 204 and the battery side connector 104 are locked. As a result, the mounting of the charged battery 101 to the vehicle body 200a is completed.

[Retraction of the Battery Mounting Table and the Elevator: Battery Replacement Apparatus]

Next, in step S9, the processor 11 lowers the battery mounting table 34 and the elevator 35 and retracts the battery mounting table 34 and the elevator 35 from the electrically powered vehicle 200. Thereafter, the processor 11 closes the shutter 32 (see FIG. 2).

[Notification of Completion of Battery Replacement Work: Battery Replacement Apparatus]

Next, in step S10, the processor 11 notifies the electrically powered vehicle 200 of the completion of the battery replacement operation through the communication unit 13.

[Receipt of the Battery Replacement Work Completion Notification: Electrically Powered Vehicle]

In step S23, the electrically powered vehicle 200 receives the notification transmitted from the communication unit 13 of the battery replacement apparatus 100 in step S10. Thus, the electrically powered vehicle 200 is brought into a state in which the ignition power supply can be turned on. Thereafter, the process ends.

In the above embodiment, the position of the drive device 30 is adjusted based on the information about each of the electrically powered vehicle 200 and the battery 201, but the present disclosure is not limited thereto. The position of the drive device 30 may be adjusted based on information about either the electrically powered vehicle 200 or the battery 201.

As described above, in the electrically powered vehicle 200 according to the present embodiment, since the vehicle body side connector 204 is movable along the fitting direction in a state where the battery side connector 104 is connected to the vehicle body side connector 204, a load acting on the vehicle body side connector 204 and the battery side connector 104 due to vibration is reduced.

Figures 11, 12:
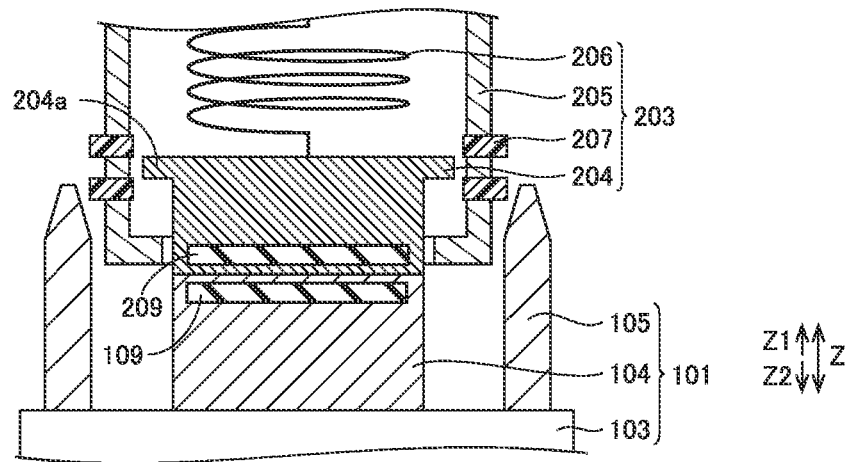
FIG. 11 is a view schematically showing a configuration of a modified example of the vehicle body side connecting portion.
FIG. 12 is a view schematically showing a configuration of a modified example of the vehicle body side connecting portion.

In the above embodiment, as shown in FIGS. 11 and 12, the vehicle body side connecting portion 203 may further include a locking portion 207. The locking portion 207 locks the position of the vehicle body side connector 204 with respect to the holding portion 205. Specifically, the locking portion 207 locks the flange 204*b*. The locking portion 207 is movable with respect to the holding portion 205 between a lock position (the position shown in FIG. 11) and an unlock position (the position shown in FIG. 12).

The lock position is a position where the vehicle body side connector 204 is locked at a position where the battery side connector 104 is connected to the vehicle body side connector 204. The unlock position allows relative movement of the battery side connector 104 with respect to the holding portion 205 in the fitting direction. In this example, the unlock position is set to a position retracted from the flange 204*b* in the orthogonal direction from the lock position.

The locking portion 207 in the lock position locks the flange 204*b* at a position where the flange 204*b* is separated from the receiving portion. The locking portion 207 in the unlock position is spaced apart from the flange 204*b* in the orthogonal direction.

The position of the locking portion 207 is controlled by the processor 11. Specifically, in step S8 in the battery replacement method, the processor 11 holds the locking portion 207 in the lock position. In step S9, the processor 11 holds the locking portion 207 in the unlock position.

It will be appreciated by those skilled in the art that the exemplary embodiments described above are specific examples of the aspects described below.

Embodiment 1

A vehicle includes a vehicle body on which a battery is mountable, and the battery attachable to and detachable from the vehicle body.

In the vehicle, the battery includes a battery side connector, the vehicle body includes a vehicle body side connector electrically connectable to the battery side connector, and a holding portion that holds the vehicle body side connector, and the holding portion holds the vehicle body side connector as being movable along a fitting direction in which the vehicle body side connector and the battery side connector are fitted to each other while the battery side connector is connected to the vehicle body side connector.

In this vehicle, since the vehicle body side connector is movable along the fitting direction while the battery side connector is connected to the vehicle body side connector, a load applied to the vehicle body side connector and the battery side connector due to vibration is reduced.

Embodiment 2

In the vehicle according to Embodiment 1, the vehicle body further includes a biasing member that biases the vehicle body side connector toward the battery side connector in the fitting direction.

In this embodiment, since the vehicle body side connector is biased toward the battery side connector, contact resistance between the vehicle body side connector and the battery side connector is reduced.

Embodiment 3

In the vehicle according to Embodiment 1 or 2, the vehicle body further includes a locking portion that locks a position of the vehicle body side connector with respect to the holding portion, and the locking portion is movable with respect to the holding portion between a lock position where the vehicle body side connector is locked at a position of connection of the battery side connector to the vehicle body side connector and an unlock position where relative movement of the battery side connector with respect to the holding portion in the fitting direction is allowed.

In this embodiment, at the time of connection of the battery side connector to the vehicle body side connector, the locking portion is set to the lock position so that the position of the battery side connector with respect to the holding portion is locked. Therefore, the battery side connector is appropriately connected to the vehicle body side connector. After the connection of the battery side connector to the vehicle body side connector, the locking portion is set to the unlock position so that the vehicle body side connector is movable along the fitting direction. Therefore, the load applied to the battery side connector and the vehicle body side connector is reduced.

Embodiment 4

In the vehicle according to any one of Embodiments 1 to 3, the holding portion holds the vehicle body side connector as being movable relative to the holding portion in a direction orthogonal to the fitting direction, and at least one of the vehicle body side connector and the battery side connector is provided with a magnet.

In this embodiment, for example, poor connection of the battery side connector to the vehicle body side connector due to positional displacement of the battery side connector with respect to the vehicle body side connector is suppressed, and the position of the battery side connector with respect to the vehicle body side connector is effectively determined by the magnet.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:

a vehicle body on which a battery is mountable; and the battery attachable to and detachable from the vehicle body, wherein:

the battery includes a battery side connector, the vehicle body includes:

a vehicle body side connector electrically connectable to the battery side connector, a holding portion that holds the vehicle body side connector, and a locking portion that locks a position of the vehicle body side connector with respect to the holding portion, the holding portion holds the vehicle body side connector as being movable along a fitting direction in which the vehicle body side connector and the battery side connector are fitted to each other while the battery side connector is connected to the vehicle body side connector, the locking portion is movable with respect to the holding portion between a lock position where the vehicle body side connector is locked at a position of connection of the battery side connector to the vehicle body side connector and an unlock position where relative movement of the battery side connector with respect to the holding portion in the fitting direction is allowed, the vehicle body side connector includes:

a connector main body electrically connected to the battery side connector, and a flange extending outward from the connector main body in an orthogonal direction orthogonal to the fitting direction, the unlock position is set at a position retracted from the flange in the orthogonal direction from the lock position, the holding portion includes:

a peripheral wall having a shape surrounding the vehicle body side connector, and a receiving portion having a shape that projects inward from a lower end of the peripheral wall in the orthogonal direction, facing the flange in the fitting direction, and receiving the flange, the locking portion locks the flange at the lock position at a position where the flange is spaced apart from the receiving portion in the fitting direction.

2. The vehicle according to claim 1, wherein the vehicle body further includes a biasing member that biases the vehicle body side connector toward the battery side connector in the fitting direction.

3. The vehicle according to claim 1, wherein the holding portion holds the vehicle body side connector as being movable relatively to the holding portion in a direction orthogonal to the fitting direction, and at least one of the vehicle body side connector and the battery side connector is provided with a magnet.

\* \* \* \* \*